C. G. SMITH.
SPRING WHEEL.
APPLICATION FILED JULY 6, 1914.
1,186,696.
Patented June 13, 1916.
2 SHEETS—SHEET 1.
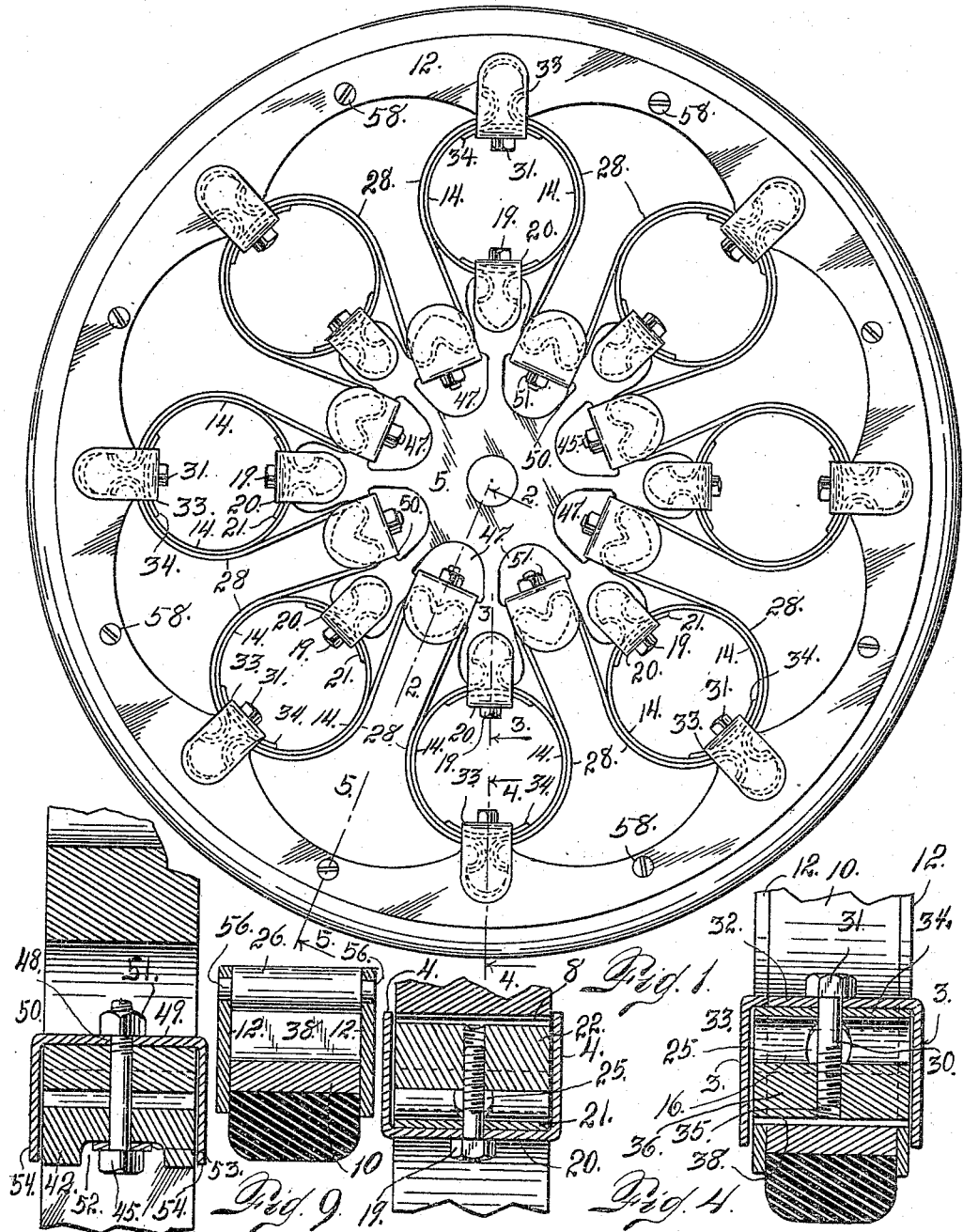
Witnesses
Otto E. Hoddick
Maze Kirby
Inventor
Cicero G. Smith
By
Attorneys

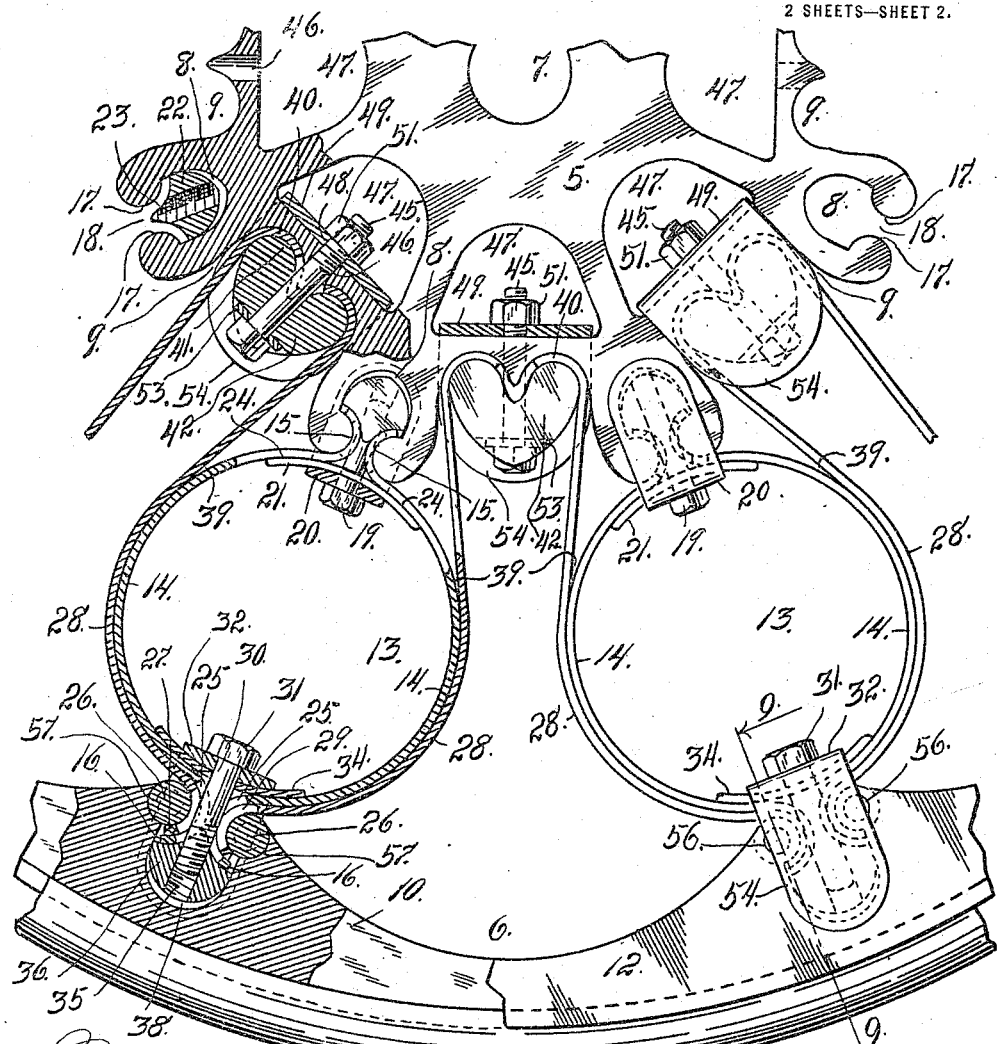

UNITED STATES PATENT OFFICE.

CICERO G. SMITH, OF PALISADES, COLORADO, ASSIGNOR TO SMITH SPRING WHEEL COMPANY, OF PALISADES, COLORADO, A CORPORATION OF ARIZONA.

SPRING-WHEEL.

1,186,696.

Specification of Letters Patent.  Patented June 13, 1916.

Application filed July 6, 1914.  Serial No. 849,120.

*To all whom it may concern:*

Be it known that I, CICERO G. SMITH, a citizen of the United States, residing at Palisades, county of Mesa, and State of Colorado, have invented certain new and useful Improvements in Spring-Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in spring wheels, my object being to provide a wheel of such resiliency or yielding capacity independently of the tire, as to avoid the necessity for inflated tires for use on wheels of vehicles, more particularly of the automobile class.

Hence, my object is to provide a wheel of such construction that solid tires may be employed without sacrificing the yielding capacity or resilience required in wheels of this class in order to afford comfort to the occupants of the vehicle.

My further object is to avoid the trouble incident to tire puncturing where pneumatic tires are employed and required.

In my improvement, I locate circular springs between the hub and rim of the wheel, and further connect the rim and hub with spoke springs which are in engagement with the circular springs and coöperate therewith in accomplishing the aforesaid function. The circular springs are each composed of two approximately semi-circular spring members, brought together in such proximity as to form a circular device, the extremities of the said members being so connected with the hub and rim of the wheel as to permit a limited degree of body movement, whereby the crystallization of the metal incident to repeated bending without the body movement, is avoided. The extremities of the semi-circular spring members are connected with the rim and hub by means of bolts located between the extremities of the two members of each circular spring, whereby the said extremities are movably locked in coöperative relation with the hub and rim, engaging blocks and washers, being employed in coöperation with the bolts to bring about this result.

Another feature of novelty consists in the employment of a wood or fiber rim member, located between metal plates arranged on opposite sides and secured to the body or wood member of the rim, thus forming a composite member of the rim, thus forming a composite structure which takes up or absorbs the vibrations and prevents crystallization, the latter difficulty being encountered where an all metal rim is employed.

Having briefly outlined my improved construction, I will proceed to describe the same in detail, reference being made to the accompanying drawing, in which is illustrated an embodiment thereof.

In this drawing, Figure 1 is a side elevation of a wheel equipped with my improvement. Figs. 2, 3, 4 and 5, are sections taken on the lines 2—2, 3—3, 4—4 and 5—5, respectively, of Fig. 1, the parts being shown on a larger scale. Fig. 6 is a fragmentary side view partly in section, of my improved wheel, the parts being shown on a larger scale than in Fig. 1. Fig. 7 is a perspective view of one of the blocks employed in connection with the bolts for securing the extremities of the spring members in coöperative relation with the hub and rim. Fig. 8 is a similar view of a block employed in connection with bolts for connecting the inner extremities of the spoke springs with the hub. Fig. 9 is a section taken on the line 9—9, Fig. 6, with parts removed.

The same reference characters indicate the same parts in all the views.

Let the numeral 5 designate the hub and 6 the rim of my improved wheel. The hub is provided with a central opening 7 to receive the spindle or axle with which the wheel is connected. The outer portion of the hub is provided with recesses 8 and 9 which are made necessary by the requirements whereby the spoke springs and circular springs are connected with the hub, as hereinafter explained in detail.

The rim 6 is composed of a body member 10 preferably composed of wood, fiber or similar non-metallic substance, to the opposite sides of which are secured metal plates 12 in order to give the rim the necessary wearing capacity or durability. Between the hub and rim are located circular springs 13, each composed of two semi-circular spring members 14, whose opposite extremities are brought together and curved outwardly to form hooks or half-eyes as shown at 15 and 16, 15 designating the inner extremities of these spring members and 16 the outer extremities thereof. The inner extremities 15 are arranged to engage spaced parts 17, which are curved to conform to the general shape of the extremities 15, and so constructed as to permit a limited degree of sliding movement in the direction of the curvature of the members 15 and their engaging parts 17. The parts 17 are separated by a space 18, which is occupied by the extremities 15, arranged in opposing relation and the shank of a bolt 19, which is passed through the part 20 of a U-shaped clip, a washer 21 and an interior block 22, which is located within the recess 8, which is an enlargement of the space 18 and in communication therewith. This block 22 engages the walls of the recess 8 on opposite sides and has a central threaded perforation 23 to receive the inner extremity of the bolt, which is threaded thereinto for securing purposes. The oppositely located parallel arms 4 of the U-shaped clip are arranged adjacent the opposite ends of the block 22 and prevent the entrance of dirt or other foreign matter to the recess 8. The exterior washer 21 is curved to conform to the portions 24 of the spring members, these portions being adjacent the curved or hook-shaped extremities of these members. The part 20 of the U-shaped clip engages the central portion of the washer 21 and has a flat outer surface which the head of the bolt engages. In order to permit a limited degree of body movement to the extremities 15 of the spring members, the latter are provided with elongated perforations 25 which receive the opposite sides of the shank of the bolt in such a manner as to permit the required movement.

The outer extremities 16 of the spring members are of similar shape to the inner extremities 15, as just described, and they are arranged to conform to the general curve of cylindrical metal members 26 mounted in the metal parts 12 of the rim, and directly engaged by similarly shaped outer extremities 27 of spoke springs 28, which are also provided with elongated perforations 29 which register approximately with the perforations 25 of the extremities 16 of the spring members.

The cylindrical metal members 26 are provided with reduced extremities 56 which engage counterpart openings formed in the plates 12 of the rim. The body portions of the members 26 are fitted into curved recesses 57 formed in the wood part 10 of the rim located between the plates 12 as heretofore explained. The perforations, both 25 and 29, are arranged on opposite sides of a shank 30 of a securing bolt 31, whose head is innermost. The shank of this bolt passes through perforations formed in the outer part 32 of a U-shaped clip 33, and a washer 34. The outer portion of this bolt enters a threaded opening 35 formed in a block 36, whose opposite inner surfaces are curved, as shown at 37, to conform to the general curvature of the extremities 16 of the spring members 14. This block 36 is located within a recess 38 formed in the rim, which recess is contracted as it extends inwardly between the curved rim parts 26 and in which contracted portion the curved or hook-shaped extremities 16 of the circular spring members, and 27 of the spoke springs, are located. The extremities 16 of the spring members 14 and the extremities 27 of the spoke springs 28 are so arranged within the recess 38 as to permit a limited degree of body movement in the direction of their curvature, and to this end, the openings 25 and 29 in their extremities are elongated in order to act in harmony with the shank of the interposed bolt during such movement. The U-shaped clip 33 is provided with outwardly extending parallel parts 3, which are arranged at the opposite extremities of the block 36, and close to the recess 38 at both ends, thus preventing the entrance of dirt or other foreign particles of matter which might interfere with the working of the parts located within this recess. These clips also hold the springs in alinement.

The portions of the spoke springs 28 from and including their outer extremities 27, are in direct contact with the spring members 14 for somewhat more than half of the length of the latter, the inner portions of the spoke springs diverging from the spring members 14 at approximately a point 39, and extending inwardly where they merge into extremities 40, which are curved to conform to the inner rounded portions 41 of a block 42 which is approximately heart-shaped in cross section. Each part 41 of the block 42 is engaged by the inner curved extremity 40 of two spoke springs, and the block is centrally recessed interiorly, as shown at 43, to receive the free ends of these spoke spring extremities 40 and permit a limited degree of body movement to these spring extremities, in the performance of their function. The block 42 is provided with a central opening 44, through which a securing bolt 45 passes, the said bolt also passing through an opening 46 formed in the hub and communicating at its outer extremity with the recess 9, in which the block 42 is located, while its inner extremity communicates with an opening 47 in the hub. The inner portion of the bolt also passes through an opening 48 formed in the part 49 of a U-shaped clip 50. A securing nut 51 is applied to the inner extremity of this bolt and screwed down upon the part 49 of the clip. The outer extremity or head of the bolt 45 is countersunk in a recess 52 formed at the exterior central part of the block 42, and communicates with the circular opening 44 in which the shank of the bolt fits. The head of this bolt also engages a washer 53 located within the recess 52. The openings 47 of the hub are of sufficient size to permit the employment of a wrench in applying the securing nuts 51. The U-shaped clips 50 are provided with exteriorly projecting parallel parts 54 which are arranged at the opposite ends of the block 42, whereby the said block is concealed on opposite sides of the wheel and the recess in which it is located protected in such a manner as to prevent the entrance of dirt or other foreign matter which might interfere with the proper performance of the function of the construction. These clips also serve to hold the spoke springs 28 in alinement.

A wheel equipped with my improved construction is provided with a number of circular springs, each comprised of two members 14, and a number of spoke springs 28, two of which work in conjunction with each circular spring and in engagement with the respective members 14 of each spring. As these sets of spring mechanism are substantially identical with one another, a description of one is a description of all. It must be understood, however, that any desired number of these sets may be employed in each wheel, and the number may be varied as circumstances or conditions may require without in any way departing from the spirit of the invention, as set forth in the appended claims.

The body member 10 of the rim is clamped between the metal plates 12 by means of bolts 58 and securing nuts 59. These bolts pass through registering apertures formed in the member 10 and both plates 12, the latter being connected with each other and with the member 10 by the bolts and securing nuts.

The blocks 22, 36 and 42 which engage the inner and outer extremities of the semi-circular spring members and the inner extremities of the spoke spring members, respectively, not only serve to retain and guide the spring extremities in coöperative relation with the other parts of the hub and rim, but they also serve to regulate the tension of the springs and are adjustable for this purpose through the medium of the bolts 19 and 31 which are threaded into the blocks 22 and 36, respectively, and the bolts 45, which pass through the heart-shaped blocks 42 and are secured in place by the nuts 51, as heretofore explained.

Having thus described my invention, what I claim is,—

1. A spring wheel comprising a hub and rim, circular springs each composed of two approximately semi-circular spring members, whose extremities are hook-shaped and brought into coöperative proximity, means for anchoring the inner extremities of the spring members in the hub, the rim being composed of a body member and plates applied thereto on opposite sides, cylindrical anchoring means arranged on opposite sides of the outer extremities of the spring members, the body member of the rim being recessed to receive said cylindrical anchoring members, a wedge block engaging the outer extremities of the spring members and arranged in opposing relation to the cylindrical members, and means for securing and adjusting the wedge block for tension purposes.

2. A spring wheel comprising a hub and rim, circular springs located between the hub and rim, each spring being composed of two approximately semi-circular members having hook-shaped extremities which are brought into coöperative proximity, means for anchoring in the hub the inner extremities of the members of each spring, the rim of the wheel being composed of a body member, plates applied thereto on opposite sides, anchoring members arranged on opposite sides of the outer extremities of the spring members, the body member of the hub being recessed to receive said anchoring members, a wedge block engaging the outer extremities of the members of each spring and arranged in opposing relation to the said anchoring members, a bolt whose shanks are located between the outer extremities of the two members of each spring, and threaded into the corresponding wedge block, and a washer through which the bolt also passes, the washer being arranged in opposing relation to the anchoring members and the wedge block, substantially as described.

3. A spring wheel composed of a hub and rim, and circular springs located between the hub and rim, each spring being composed of two approximately semi-circular members, means for anchoring the inner extremities of said members in the hub, the rim being composed of a body member and plates applied thereto on opposite sides, the rim having anchoring openings to receive the outer extremities of the members of each spring, anchoring members arranged on opposite sides of the outer extremities of the two members of each spring, the body member of the hub being recessed to receive said anchoring members, a wedge block located in the anchoring opening of the rim and engaging the outer extremities of the members of each spring, a bolt whose shank is located between the outer extremities of the members of each spring and threaded into the wedge block, and a U-shaped clip having a part serving as a washer and through which part the said bolt passes, other parts of the clip being arranged on opposite sides of said rim opening.

4. A spring wheel for vehicles, comprising a hub, circular springs located between the rim and hub, each spring being composed of two semi-circular members whose extremities are anchored in the hub and rim, spoke springs curved throughout a portion of their length adjacent their outer extremities concentrically with said circular springs, the curved portions of said spoke springs bearing upon and embracing said circular springs, means for anchoring the outer extremities of the spoke springs in conjunction with the corresponding extremities of the circular spring members, openings formed in the hub for receiving the inner extremities of the spoke springs, a block located in each opening and engaging the inner extremities of two adjacent springs exteriorly, and a single securing bolt passing through said block, and located between the inner extremities of the said spoke springs.

In testimony whereof I affix my signature in presence of two witnesses.

CICERO G. SMITH.

Witnesses:
G. W. BOWMAN,
W. S. FURMAN.

Copies of this patent may be obtained for five cents each, by addressing the "Commissioner of Patents, Washington, D. C."